US010341177B2

(12) United States Patent
Kato

(10) Patent No.: US 10,341,177 B2
(45) Date of Patent: Jul. 2, 2019

(54) PARALLEL COMPUTING SYSTEM AND MIGRATION METHOD

(71) Applicant: FUJITSU LIMITED, Kawasaki-shi, Kanagawa (JP)

(72) Inventor: Takeharu Kato, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 505 days.

(21) Appl. No.: 15/202,034

(22) Filed: Jul. 5, 2016

(65) Prior Publication Data
US 2017/0041191 A1    Feb. 9, 2017

(30) Foreign Application Priority Data
Aug. 4, 2015 (JP) .................................. 2015-153972

(51) Int. Cl.
*H04L 12/24* (2006.01)
*H04L 29/08* (2006.01)
(Continued)

(52) U.S. Cl.
CPC ........ *H04L 41/0813* (2013.01); *G06F 9/4856* (2013.01); *G06F 12/08* (2013.01); *H04L 41/0846* (2013.01); *H04L 41/0886* (2013.01); *H04L 41/0896* (2013.01); *H04L 67/34* (2013.01); *G06F 2212/1024* (2013.01)

(58) Field of Classification Search
None
See application file for complete search history.

(56) References Cited

U.S. PATENT DOCUMENTS 6,760,815 B1 * 7/2004 Traversat ............ G06F 9/45504
707/999.202
8,752,048 B1 * 6/2014 Backensto .......... G06F 11/1479
714/13
(Continued)

FOREIGN PATENT DOCUMENTS

JP    2005-327279    11/2005
JP    2008-269000    11/2008
(Continued)

OTHER PUBLICATIONS

Japanese Office Action dated Feb. 5, 2019 for corresponding Japanese Patent Application No. 2015-153972, with English Translation, 7 pages.
(Continued)

*Primary Examiner* — Backhean Tiv
(74) *Attorney, Agent, or Firm* — Fujitsu Patent Center

(57) ABSTRACT

A first node stores therein accessed-area information that indicates a first area included in a storage area assigned to a target process, the first area having been accessed by the target process for a latest predetermined period of time. The first node stops the target process when an instruction to migrate the target process is received, transmits, to a second node, state information that indicates a state of the target process when the target process is stopped, and transmits first data stored in a first area to the second node, on the basis of the accessed-area information. The second node receives the state information and the first data from the first node, generates the target process on the basis of the state information, and restarts the target process using the first data.

3 Claims, 9 Drawing Sheets

(51) Int. Cl.
*G06F 12/08* (2016.01)
*G06F 9/48* (2006.01)

(56) References Cited

U.S. PATENT DOCUMENTS

| | | | | |
|---|---|---|---|---|
| 9,110,722 | B2* | 8/2015 | Adams | G06F 9/5088 |
| 9,146,779 | B2* | 9/2015 | Kihara | G06F 9/4856 |
| 9,286,109 | B1* | 3/2016 | Backensto | G06F 9/461 |
| 10,015,266 | B1* | 7/2018 | Shavell | H04L 67/148 |
| 2003/0069903 | A1* | 4/2003 | Gupta | G06F 16/217 |
| 2003/0163761 | A1* | 8/2003 | Chen | G06F 9/546 |
| | | | | 714/10 |
| 2004/0029622 | A1* | 2/2004 | Laroia | H04W 16/12 |
| | | | | 455/574 |
| 2005/0268298 | A1* | 12/2005 | Hunt | G06F 9/4856 |
| | | | | 718/1 |
| 2007/0169121 | A1* | 7/2007 | Hunt | G06F 9/4856 |
| | | | | 718/1 |
| 2007/0294578 | A1* | 12/2007 | Qiao | G06F 11/203 |
| | | | | 714/17 |
| 2009/0157882 | A1* | 6/2009 | Kashyap | H04L 69/16 |
| | | | | 709/227 |
| 2009/0171999 | A1* | 7/2009 | McColl | G06F 16/2465 |
| 2010/0094948 | A1* | 4/2010 | Ganesh | G06F 9/4856 |
| | | | | 709/212 |
| 2010/0169494 | A1* | 7/2010 | Machulsky | H04L 69/16 |
| | | | | 709/227 |
| 2010/0175063 | A1* | 7/2010 | Ciano | G06F 9/4862 |
| | | | | 718/1 |
| 2011/0145816 | A1* | 6/2011 | Glikson | G06F 9/45558 |
| | | | | 718/1 |
| 2011/0173302 | A1* | 7/2011 | Rider | G06F 9/44505 |
| | | | | 709/220 |
| 2011/0282987 | A1* | 11/2011 | Uchida | G06F 3/1211 |
| | | | | 709/224 |
| 2011/0314345 | A1* | 12/2011 | Stern | G06F 11/3466 |
| | | | | 714/47.1 |
| 2012/0114025 | A1* | 5/2012 | Gauthier | H04B 7/0811 |
| | | | | 375/219 |
| 2012/0198431 | A1* | 8/2012 | Lin | G06F 8/65 |
| | | | | 717/168 |
| 2013/0036417 | A1* | 2/2013 | Chen | G06F 9/5077 |
| | | | | 718/1 |
| 2014/0006581 | A1* | 1/2014 | Raghu | G06F 9/5072 |
| | | | | 709/223 |
| 2014/0089393 | A1* | 3/2014 | Druet | H04L 67/34 |
| | | | | 709/203 |
| 2014/0148205 | A1* | 5/2014 | Grinshpun | H04L 69/16 |
| | | | | 455/466 |
| 2014/0330783 | A1* | 11/2014 | Provencher | G06F 16/2365 |
| | | | | 707/638 |
| 2015/0169329 | A1* | 6/2015 | Barrat | G06F 9/5077 |
| | | | | 713/2 |
| 2015/0378783 | A1* | 12/2015 | Tarasuk-Levin | G06F 16/273 |
| | | | | 718/1 |
| 2016/0164722 | A1* | 6/2016 | Zhu | G06F 16/27 |
| | | | | 709/221 |

FOREIGN PATENT DOCUMENTS

| | | |
|---|---|---|
| JP | 2010-134710 A | 6/2010 |
| JP | 2014-52725 A | 3/2014 |
| WO | 2012/063334 | 5/2012 |

OTHER PUBLICATIONS

JPOA—Japanese Office Action dated May 21, 2019 for corresponding Japanese patent application No. 2015-153972, with machine translation of the Office Action.

* cited by examiner

FIG. 4A

| PHYSICAL ADDRESS | P BIT | A BIT |
|---|---|---|

FIG. 4B

| INDEX | PHYSICAL ADDRESS | A BIT | P BIT |
|---|---|---|---|
| 0 | AAAA | 0 | 0 |
| 1 | BBBB | 1 | 0 |
| 2 | CCCC | 1 | 1 |
| 3 | DDDD | 0 | 1 |
| ... | ... | ... | ... |

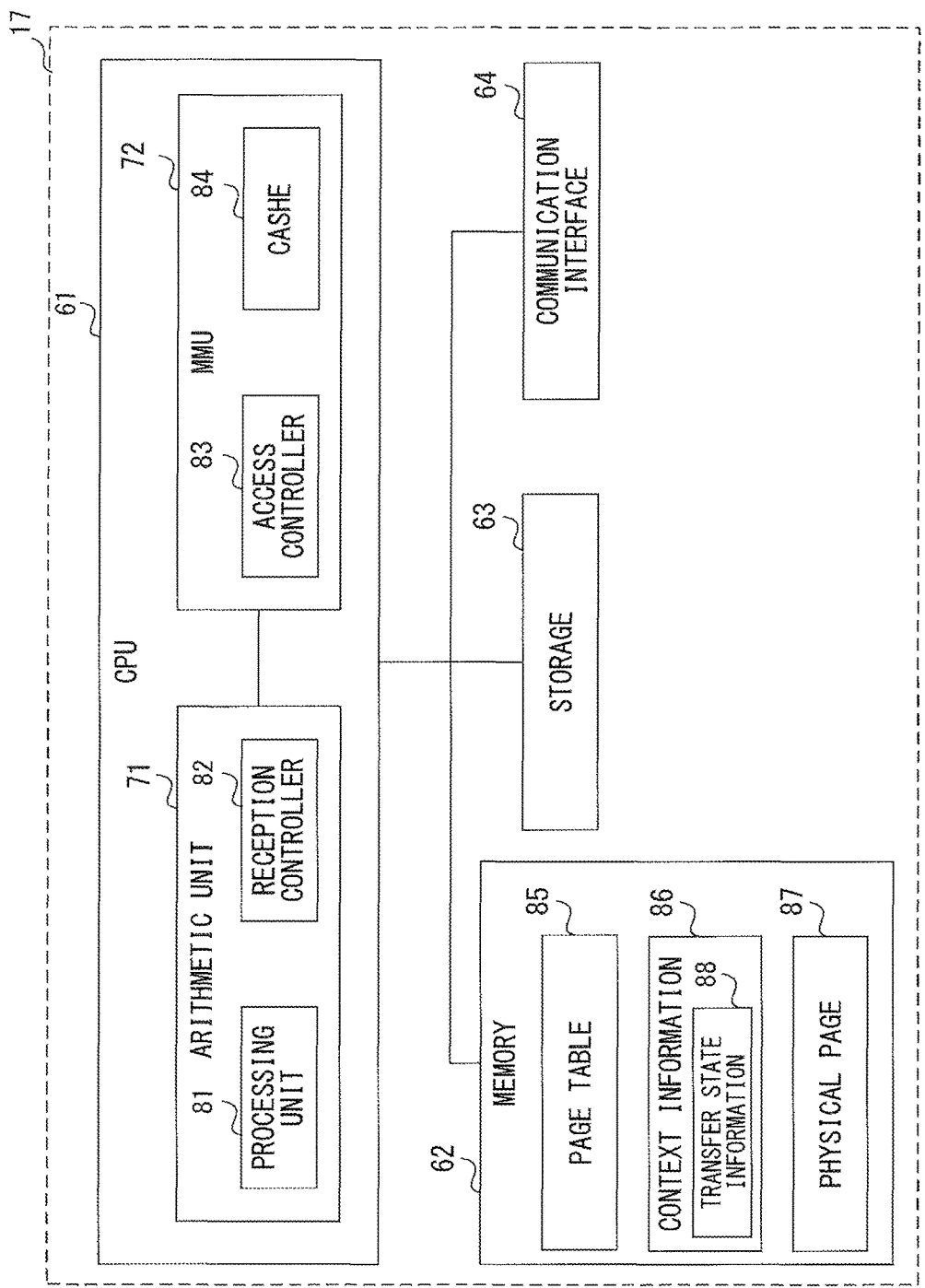
F I G. 5

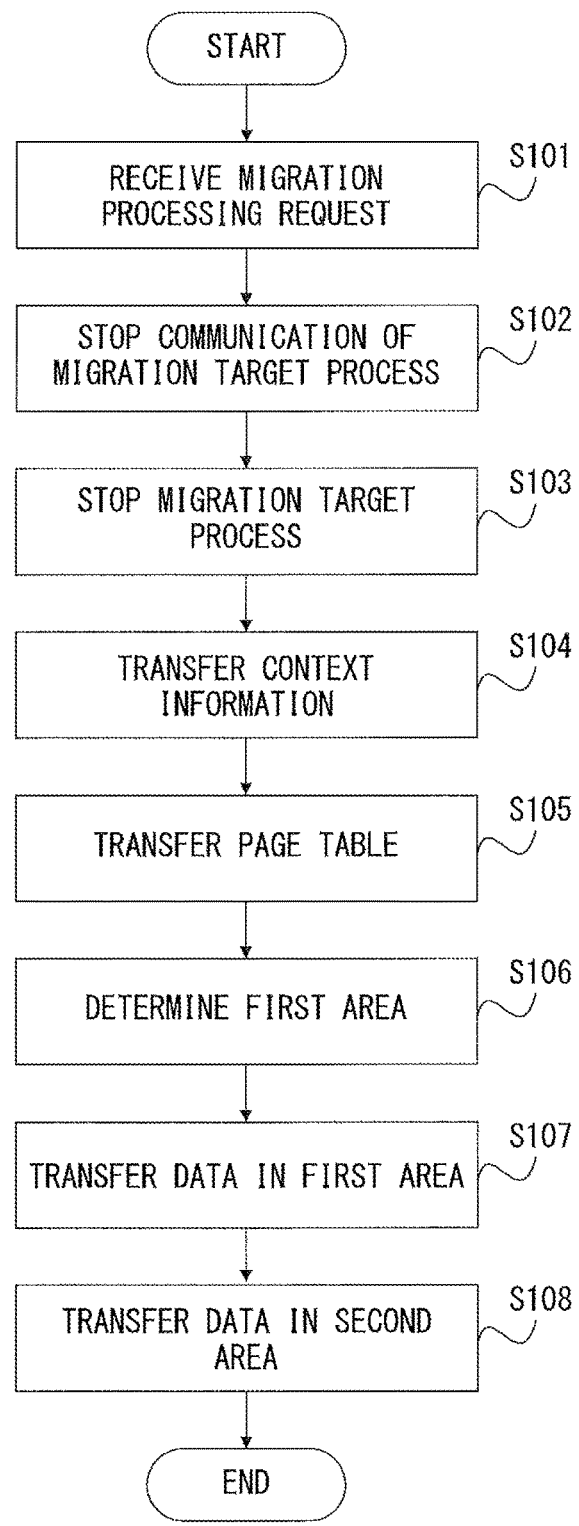
F I G. 6

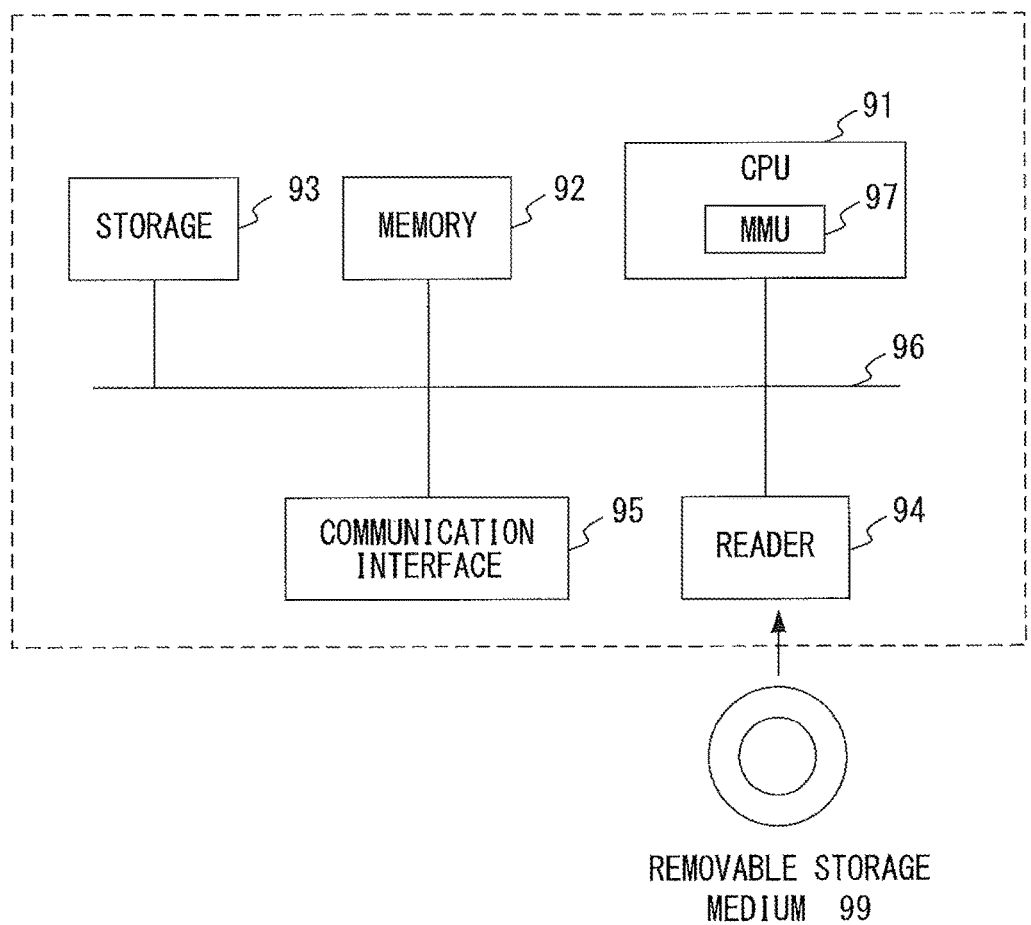
F I G. 9

PARALLEL COMPUTING SYSTEM AND MIGRATION METHOD

CROSS-REFERENCE TO RELATED APPLICATION

This application is based upon and claims the benefit of priority of the prior Japanese Patent Application No. 2015-153972, filed on Aug. 4, 2015, the entire contents of which are incorporated herein by reference.

FIELD OF INVENTION

The embodiments discussed herein are related to a parallel computing system, a migration method, and a migration program.

BACKGROUND

A technology that migrates a process or software from a node to another node is called migration. As an example of the migration, there is live migration that reduces downtime of a process or software to be migrated to the extent that it becomes negligibly short, so as to perform migration without stopping the service. Specifically, the live migration is used to migrate a process between nodes on a server or to migrate a virtual machine (VM) on a hypervisor. The process is an execution unit for a program. The node is an execution unit for processing of executing a process.

For example, it is possible to perform load balancing between nodes by migrating a process from a heavily loaded node to a lightly loaded node by live migration. Further, for example, when a node is stopped due to, for example, maintenance, it is possible to increase the availability of a process that is operating on the node to be stopped by saving the process to another node.

The following first to third technologies are migration-related technologies (see, for example, Patent Documents 1 to 3).

In the first technology, before migration, a first virtual machine has an operating system and an application in a first private memory private to the first virtual machine. A communication queue of the first virtual machine resides in a shared memory shared by first and second computers or first and second logical partitionings (LPARs). The operating system and application are copied from the first private memory to the shared memory, and then, they are copied from the shared memory to a second private memory private to the first virtual machine in the second computer or second LPAR. The first virtual machine is resumed in the second computer or second LPAR.

According to a device of the second technology, a state of a page of a logical partition is automatically tracked so as to encourage a firmware migration in a logically partitioned environment. Using a table that has a plurality of entries corresponding to a plurality of page states, a process encourages a logical partition migration. When a logical partition is migrated, a state of each page is recorded and maintained in a table entry.

According to a device of the third technology, a switch is connected between a central processing unit (CPU) and input/outputs (I/Os). The switch includes a memory monitoring mechanism that monitors a memory writing and a dirty bit array that stores therein whether each page on a memory is dirty. The memory monitoring mechanism monitors a memory writing from an I/O to the CPU, determines, from an address of the memory writing, which page becomes dirty, and updates the dirty bit array. The dirty bit array stores therein dirty/not-dirty for each page, and can be accessed from a hypervisor as a continuous region.

Patent Document 1: Japanese Laid-open Patent Publication No. 2005-327279

Patent Document 2: Japanese Laid-open Patent Publication No. 2008-269000

Patent Document 3: International Publication Pamphlet No. WO 2012/063334

In live migration, a content of a memory assigned to a process to be migrated is transferred from a migration source node to a migration destination node. When such a transfer is performed while the process to be migrated is operating, the content of the memory to be transferred may be rewritten during the transfer. In this case, the transfer source and the transfer destination have different contents of the memory, so the process will not continue to be executed normally in the transfer destination. Thus, in live migration, a memory is transferred after a migration process is stopped, and the process is restarted in the transfer destination node after the completion of the transfer of the memory.

When a process to be migrated uses a large amount of memory space, it takes long to transfer a content of a memory. In migration, the process to be migrated is stopped during the transfer of the content of the memory. Thus, the process downtime is longer if the transfer time is longer.

SUMMARY

A parallel computing system according to an aspect includes a first node and a second node. The parallel computing system migrates, to the second node, a target process that is being executed in the first node, the first node and the second node being one of the nodes that are an execution unit for processing of executing a process. The first node includes a storage, a processor, and a transmitter. The storage stores therein accessed-area information that indicates a first area included in a storage area assigned to the target process, the first area having been accessed by the target process for a latest predetermined period of time. The processor in the first node stops the target process when an instruction to migrate the target process is received. The transmitter transmits, to the second node, state information that indicates a state of the target process when the target process is stopped, and transmits first data stored in the first area to the second node, on the basis of the accessed-area information. The second node includes a receiver and a processor. The receiver receives the state information and the first data from the first node. The processor in the second node generates the target process on the basis of the state information and restarts the target process using the first data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 4A and 4B illustrate an example of a configuration of a page table according to the embodiment;

FIG. 5 illustrates an example of a configuration of a migration destination node according to the embodiment;

FIG. 6 is a flowchart of an example of detailed migration processing performed by the transmission controller in the migration source node;

FIG. 9 illustrates an example of a hardware configuration of the migration source node and the migration destination node according to the embodiment.

DESCRIPTION OF EMBODIMENTS

Figure 1:
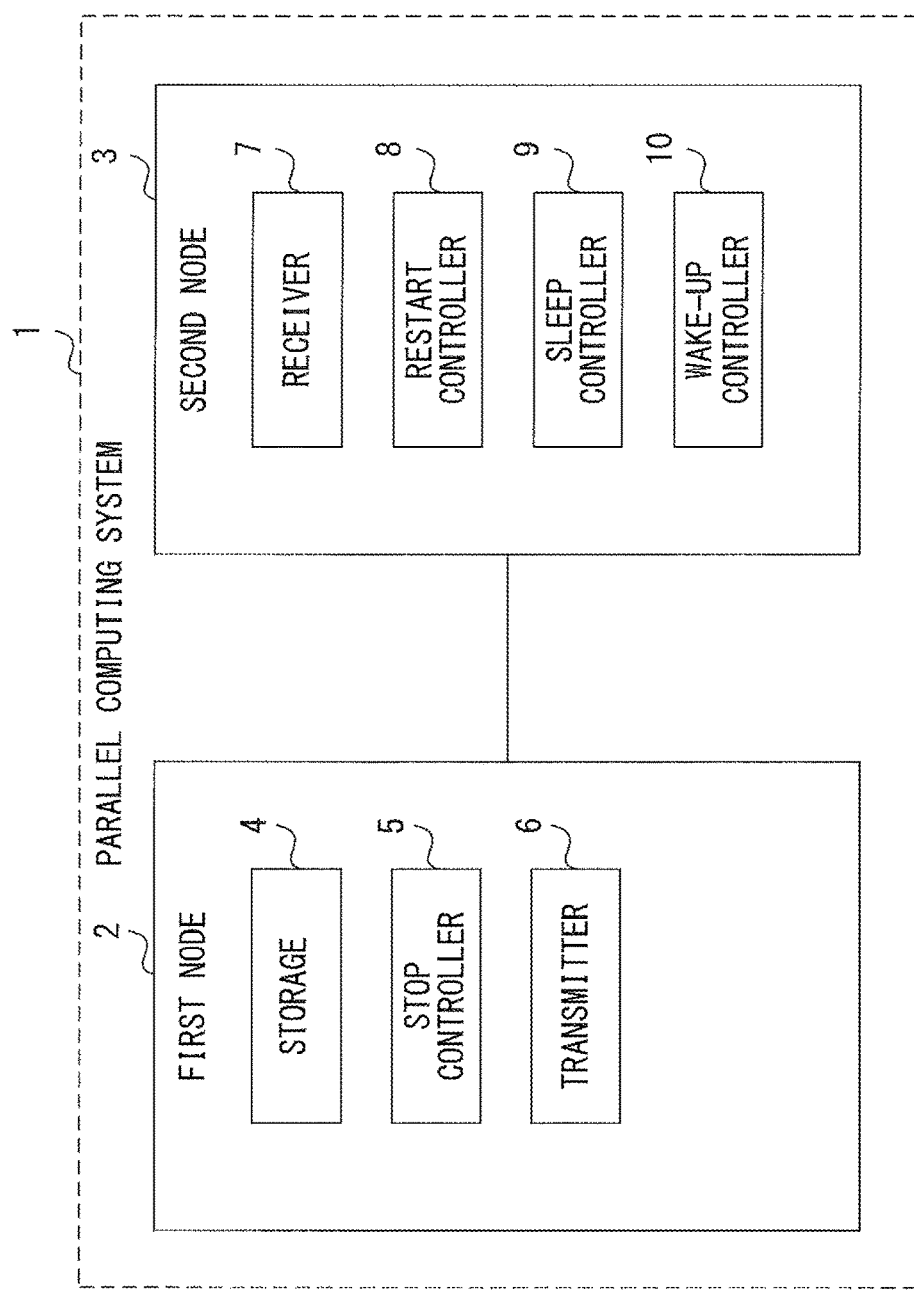
FIG. 1 is a functional block diagram of an example of a parallel computing system according to an embodiment.

FIG. 1 is a functional block diagram of an example of a parallel computing system according to an embodiment. In FIG. 1, a parallel computing system 1 includes a first node 2 and a second node 3. The parallel computing system 1 migrates, to the second node 3, a target process that is being executed in the first node 2. The first node 2 and the second node 3 are one of the nodes that are an execution unit for processing of executing a process.

The first node 2 includes a storage 4, a stop controller 5, and a transmitter 6. The storage 4 stores therein accessed-area information that indicates a first area included in a storage area assigned to the target process, the first area having been accessed by the target process for a latest predetermined period of time. The stop controller 5 stops the target process when an instruction to migrate the target process is received. The transmitter 6 transmits, to the second node 3, state information that indicates a state of the target process when the target process is stopped, and transmits first data stored in the first area to the second node 3, on the basis of the accessed-area information.

The second node 3 includes a receiver 7, a restart controller 8, a sleep controller 9, and a wake-up controller 10. The receiver 7 receives the state information and the first data from the first node 2. The restart controller 8 generates the target process on the basis of the state information and restarts the target process using the first data.

When the transfer of the data in the first area has been completed, the second node 3 restarts the target process is restarted. As a result, compared with the case in which the target process is restarted after the transfer of the data in the entirety of the memory space for the process has been completed, it is possible to reduce process downtime in migration. Specifically, for example, in a scientific computation, when an amount of memory space handled by a migration target process is large while an amount of memory space used to execute the process is small for a short period of time, the effects of reducing process downtime are increased. The reason for this is that the first area accounts for a smaller portion of the entirety of the memory space for the target process.

After the transmission of the first data has been completed, the transmitter 6 transmits, to the second node 3, second data stored in a second area other than the first area in the storage area. The receiver 7 receives the second data from the first node 2 during an execution of the target process.

The second node 3 receives the second data after the target process is restarted. This permits the second node 3 to receive the second data and to execute the target process in parallel. As a result, compared with the case in which the target process is restarted after the transfer of the data in the entirety of the memory space for the process has been completed, it is possible to reduce process downtime in migration, and this permits an efficient data transfer.

The accessed-area information is information recorded in a page table of a target process by a memory management unit provided in a central processing unit (CPU) that executes the target process. Such a configuration permits recording of information needed to determine the first area by use of hardware of the memory management unit without incorporating special software. Further, the memory space for the target process is always accessed through the memory management unit, so it is possible to determine the first area with respect to the entirety of the memory space for the process that includes a data area.

When an access has been made to an area from which data has not been received, the area being included in the second area, the sleep controller 9 causes a target process to sleep. When the data in the area from which the data has not been received is received, the wake-up controller 10 causes the sleeping target process to wake up. Such a configuration prevents an abnormal termination of the restarted migration target process due to, for example, error when an access has been made to a non-transfer area.

(Configuration of Information Processing System)

Figure 2:
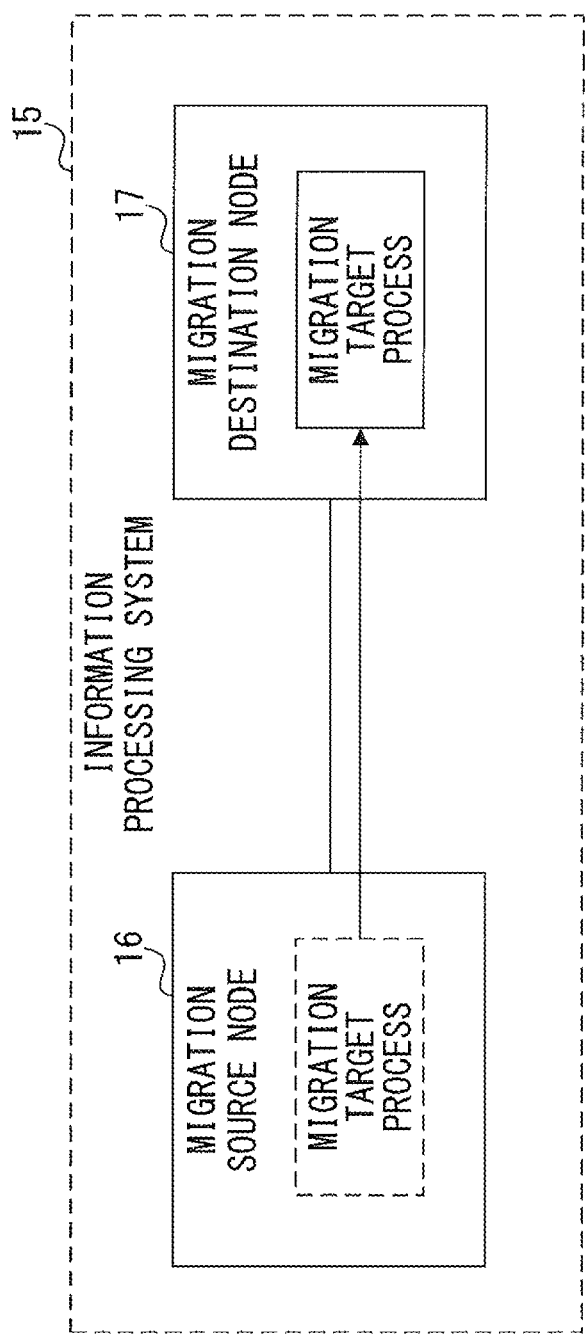
FIG. 2 illustrates an example of a configuration of an information processing system according to the embodiment.

FIG. 2 illustrates an example of a configuration of an information processing system according to the embodiment. In FIG. 2, an information processing system 15 includes a migration source node 16 and a migration destination node 17. The migration source node 16 and the migration destination node 17 are connected to each other such that transmission/reception of data can be performed between them. In the embodiment, a migration target process that is operating in the migration source node 16 is migrated by migration to the migration destination node 17.

For example, the information processing system 15 may have a configuration in which a plurality of processes including a process to be migrated operate and perform processing in parallel while each of the processes repeats arithmetic processing and processing of communication between processes. For example, the information processing system may be a parallel computer, or may include a large number of nodes including the migration source node 16 and the migration destination node 17.

Each node may be, for example, an information processing device. Alternatively, each node may be, for example, a virtual machine created on a hypervisor or an LPAR that operates on the same physical server or on a different physical server.

The information processing system 15 is an example of the parallel computing system 1. The migration source node 16 is an example of the first node 2. The migration destination node 17 is an example of the second node 3.

(Configuration of Migration Source Node)

Figure 3:
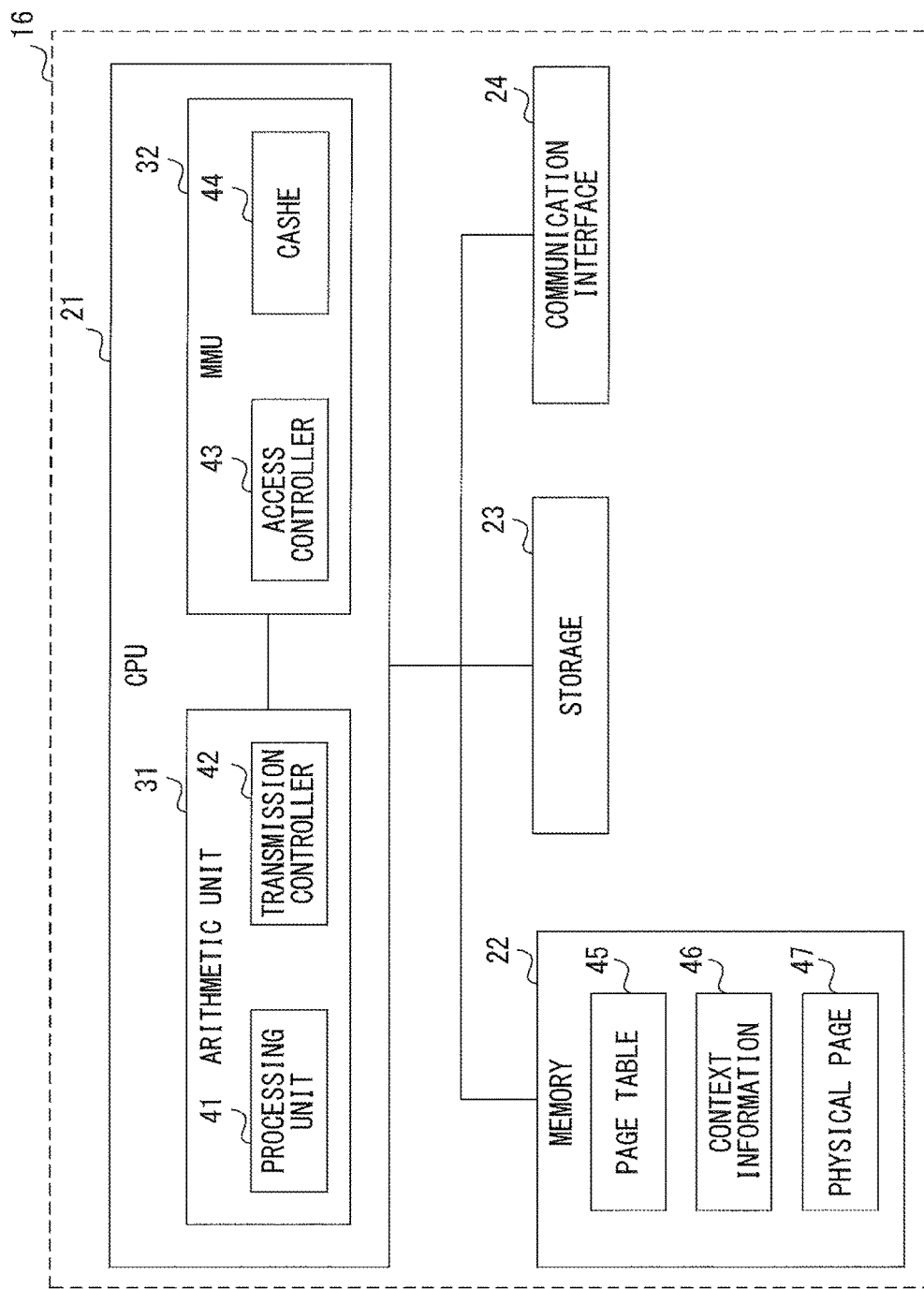
FIG. 3 illustrates an example of a configuration of a migration source node according to the embodiment.

FIG. 3 illustrates an example of a configuration of the migration source node according to the embodiment. In FIG. 3, the migration source node 16 includes a CPU 21, a memory 22, a storage 23, and a communication interface 24.

The CPU 21 includes an arithmetic unit 31 and a memory management unit (MMU) 32.

The arithmetic unit 31 is a core of the CPU 21 and performs arithmetic processing. The arithmetic unit 31 includes a processing unit 41 and a transmission controller 42. The transmission controller 42 is an example of the stop controller 5 and the transmitter 6.

The processing unit 41 executes an operating system (OS) or a process to be migrated. The OS manages a memory of a process in a virtual memory method. In the virtual memory method, a virtual memory area that is different from a physical memory area is assigned to a process. The process recognizes the virtual memory area assigned to the process itself, so as to make a memory access. The physical memory area and the virtual memory area are respectively divided into physical pages and virtual pages, each being divided into pages for each predetermined size. A physical address and a virtual address are respectively assigned to the physical page and the virtual page. A predetermined range of the virtual address is referred to as a virtual address space. A virtual address space assigned to a process is independent of a virtual address space of another process. The virtual page is associated with (mapped to) the physical page.

The transmission controller 42 performs migration processing on a process in the migration source node 16. Specifically, the transmission controller 42 performs processing of transferring information on a process to be migrated to the migration destination node. The migration processing will be described in detail later.

The MMU 32 performs processing related to a memory access from the arithmetic unit 31. The MMU 32 provides some of the functions for a memory management performed by a virtual memory. Some of or all of the functions of the MMU 32 are realized by hardware.

The MMU 32 includes an access controller 43 and a cache 44.

The access controller 43 translates a virtual address to a physical address mapped to the virtual address. The address translation is performed on the basis of a page table including information that indicates a mapping of a virtual address and a physical address. Specifically, when an access target virtual address is input from the processing unit 41, the access controller 43 translates the input virtual address to a physical address on the basis of the page table, and returns the physical address to the processing unit 41. The processing unit 41 accesses a real memory using the physical address returned from the access controller 43. Further, when a memory access has been made, the access controller 43 records, in the page table, information that identifies an accessed virtual page.

The cache 44 is a storage that realizes a speed up of an address translation performed by the access controller 43. A page table is used for the address translation, and the entirety of the page table is stored in the memory 22. The cache 44 stores therein a portion (a subset) of the page table, and the access controller 43 accesses the subset of the page table stored in the cache 44 on the MMU 32 so as to realize a speed up of an address translation. Specifically, the cache 44 is, for example, a translation lookaside buffer (TLB).

The memory 22 stores therein a page table 45, context information 46 on a process, and a physical page 47 assigned to each process. The memory 22 is an example of the storage 4.

The page table 45 includes information that indicates an association (a mapping) of a virtual address and a physical address. The page table 45 is used for an address translation performed by the MMU 32. The page table 45 will be described in detail later.

The context information 46 is information that indicates a state of a process. In migration, the context information 46 is used, in the migration destination node 17, to recreate a state of a migration target process when the migration target process is stopped. Specifically, the context information 46 includes, for example, information on a register used by a process and information on a file descriptor. The context information 46 is dynamically managed by an OS.

The physical page 47 is a physical storage area having a predetermined size that is mapped to a virtual page.

The storage 23 stores therein various pieces of data. The storage 23 may include a swap area. The swap area is an area that is used in virtual memory management to save a portion of data in case of lack of area on the memory 22.

The communication interface 24 performs transmission/reception of data to/from the migration destination node 17. Data transmitted from the transmission controller 42 to the migration destination node 17 is transmitted through the communication interface 24.

(Configuration of Page Table)

Here, a configuration of the page table 45 is described. FIGS. 4A and 4B illustrate an example of a configuration of the page table according to the embodiment. The page table 45 includes information that indicates a mapping of a virtual address and a physical address. Further, the page table 45 includes information that indicates whether an access to each virtual page has been made for a latest predetermined period of time. The page table 45 is generated for each process.

Specifically, the page table 45 includes a page table entry (PTE). Each PTE corresponds to a virtual page and stores therein information on a physical page assigned to the virtual page. FIG. 4A illustrates an example of a configuration of the PTE. In FIG. 4A, the PTE includes data items such as "PHYSICAL ADDRESS", "P (Present) BIT", and "A (Access) BIT".

"PHYSICAL ADDRESS" stores therein Information indicating a physical address mapped to a virtual address. Specifically, a start address of a physical memory block is stored in "PHYSICAL ADDRESS". The virtual address corresponds to an index in an array of a PTE.

"P BIT" indicates whether a physical page given in "PHYSICAL ADDRESS" is assigned to a virtual page. In other words, "P BIT" indicates that a virtual address is mapped to a physical address and that data of the physical address exists on the memory 22 at present (that is, it is not swapped out). In the embodiment, it is assumed that a physical page is assigned when "1" is set in "P BIT". It is assumed that a physical page is not assigned when "0" is set in "P BIT". The value in "P BIT" is set by the arithmetic unit 31 (OS), and not by the access controller 43.

"A BIT" indicates whether an access has been made to a physical page given in "PHYSICAL ADDRESS". In the embodiment, it is assumed that an access has been made to a corresponding physical page when "1" is set in "A BIT". It is assumed that an access has not been made to a corresponding physical page when "0" is set in "A BIT". The value in "A BIT" is set to by the access controller 43 when an access has been made to a corresponding page. The value in "A BIT" is regularly set to "0" by the arithmetic unit 31 (OS). Once the value in "A BIT" has been set to "1" by the access controller 43, the access controller 43 will never set the value in "A BIT" to "0". The information in "A BIT" is an example of access control information.

The PTE may include information that indicates various attributes of a physical page. For example, the PTE may include a protection attribute of a physical page or information that indicates, for example, whether the page has been written.

FIG. 4B illustrates an example of a configuration of the page table 45 including a PTE. In FIG. 4B, the page table 45 stores therein one or more PTEs in an array structure. An index in an array of a PTE corresponds to a virtual page number. In other words, a physical page 47 corresponding to a PTE is mapped to a virtual page represented by the index of the PTE.

Next, processing that is performed when a process makes an access is described. When a memory access is made, an access target virtual address is input into the access controller 43 of the MMU 32. The access controller 43 translates the input virtual address to a physical address, and records information that indicates an input virtual page has been accessed. When the physical address is not assigned to the virtual page to be accessed, a page fault is generated.

(Address Translation)

First, address translation processing performed by the MMU 32 is described.

When an access target virtual address is input from the arithmetic unit 31, the access controller 43 translates the virtual address to a physical address. Specifically, first, the access controller 43 searches for a PTE corresponding to a requested virtual address in a subset of the page table 45 stored in the cache 44. When the PTE corresponding to the requested virtual address has not been found out as a result, the access controller 43 searches for the corresponding PTE in the page table 45 on the memory 22 (it executes a page table walk). Then, the access controller 43 refers to a PTE obtained as a result of the search so as to confirm whether a physical address is assigned to the desired virtual page. When it determines that the physical address is assigned to the desired virtual page, the access controller 43 returns the physical address of the PTE to the arithmetic unit 31. On the other hand, when it determines that the physical address is not assigned to the desired virtual page, the access controller 43 reports, to the arithmetic unit 31, an exception that is a page fault.

The access controller 43 executes, not through an OS, a page table walk by processing performed by hardware (hardware page table walk). It is assumed that the position of the page table 45, on the memory 22, in which the access controller 43 searches is preset in a predetermined storage area in the MMU 32.

(Recording of Accessed Virtual Page)

Next, processing of recording information indicating that a virtual page has been accessed is described.

As described above, when an access target virtual address is input from the arithmetic unit 31, the access controller 43 performs the address translation processing. At this point, the access controller 43 records, in "A BIT" of a PTE corresponding to a target virtual page, information indicating that the target virtual page has been accessed (it sets to "1"). On the other hand, the value in "A BIT" of the PTE is regularly cleared by the arithmetic unit 31 (OS) (it is set to "0"). Thus, the value in "A BIT" in each PTE is information indicating whether a corresponding page has been accessed from a latest clear made by the OS onwards. Accordingly, it is possible to identify a page that has been accessed for a latest predetermined period of time by referring to the value in "A BIT" of a PTE.

(Page Fault Handler)

Next, processing that is performed when a virtual page to which a physical page is not assigned has been accessed is described.

When a virtual page to which a physical page is not assigned has been accessed, the access controller 43 generates an exception that is a page fault. Specifically, for example, the access controller 43 refers to a PTE corresponding to a virtual page that has been requested to access, and when the value in "P BIT" of the PTE is "0", the access controller 43 generates a page fault and reports it to the arithmetic unit 31. Further, when an access has been made to an incorrect area, the access controller 43 also generates a page fault. The incorrect area is an area having an unusual address that is not supposed to exist, or an area managed by a process different from the process that made an access. It is detected, on the basis of the page table 45 of the process, an access has been made to an incorrect area. With respect to an access for which a page fault is generated, the virtual page to be accessed is hereinafter referred to as a "target page" for convenience of description.

When a generation of a page fault is reported, software called a page fault handler is started in the OS. The page fault handler performs a variety of processing for fixing a page fault (hereinafter referred to as page-fault fixing processing). Specifically, for example, when a physical address is not mapped to a target page, the page fault handler maps a new physical page to the target page, and records the mapping information in a PTE. Further, for example, when a physical page corresponding to the target page does not exist on the memory 22, the page fault handler performs processing of replacing a page, on the memory 22, that is not used at present with the corresponding page in the storage 23 (swapping). Furthermore, for example, when the target page is an incorrect area, the page fault handler determines that it is an invalid access, and forces a program that generated a page fault to terminate. The page fault handler is a portion of the function of the OS.

The processing that is performed when a process makes an access has been described above. Next, the migration processing performed by the transmission controller 42 in the migration source node 16 is described.

(Migration Processing in Migration Source Node)

In the migration processing, the transmission controller transfers information on a process to be migrated (hereinafter referred to as a migration target process) to the migration destination node. In other words, the transmission controller transfers the context information 46 and the page table 45 for the migration target process, and data in a virtual memory space assigned to the migration target process. In the embodiment, the data in the memory space for the migration target process is transferred in two stages. As a first stage, a memory area that has been accessed by the migration target process for a latest predetermined period of time (hereinafter referred to as a first area) is transferred. After that, a non-transfer memory area (hereinafter referred to as a second area) is transferred. The second area is an area other than the first area in the virtual memory space assigned to the migration target process.

Specifically, first, the transmission controller 42 receives a migration-source processing request that instructs to perform migration on a migration target process. The migration-source processing request includes identification information that identifies the migration target process. When it receives the migration-source processing request, the transmission controller 42 stops the communication of the migration target process. The stop of the communication of the migration target process prevents the occurrence of a mismatch or an error of a communication with a communication partner. Next, the transmission controller 42 stops the migration target process. The stop of the migration target process prevents a content of a memory of a migration source from being updated while during migration.

Next, the transmission controller 42 saves the context information 46 on the migration target process from the memory 22 to the storage 23. Then, the transmission controller 42 transfers the saved context information 46 to the migration destination node 17. The context information 46 to be transferred here indicates a state of the migration target process when it is stopped, and is used, in the migration destination node 17, to recreate the state of the migration target process.

Further, the transmission controller 42 transfers the page table 45 of the migration target process to the migration destination node 17. In this case, the page table 45 to be transferred is used, in the migration destination node 17, to recreate the page table 45 of the migration target process.

The context information 46 and the page table 45 are transferred after the migration target process is stopped, which prevents the context information 46 and the page table 45 from being modified during the transfer.

Then, the transmission controller 42 transfers the data in the memory space for the migration target process. First, as a first stage, in order to transfer data in the first area first, the transmission controller 42 refers to "A BIT" of a PTE in the page table 45 so as to determine the first area in the memory space for the migration target process. In other words, the transmission controller 42 determines, to be the first area, a collection of the virtual pages corresponding to PTEs having the value "1" in "A BIT" in the page table 45 of the migration target process. Then, the transmission controller 42 transfers the data in the determined first area to the migration destination node 17.

Here, the first area is determined on the basis of the value in "A BIT" of the PTE in the page table 45. As described above, the setting of "A BIT" in a page table is realized by the function of the MMU 32. Thus, the embodiment can be applied to the entirety of a memory space for a process to be accessed through the MMU 32. Further, this permits recording of information needed to determine the first area by use of a function of hardware of the MMU 32 without incorporating special software.

When the transfer of the data in the first area has been completed, the transmission controller 42 transfers data in the second area to the migration destination node 17. In other words, the transmission controller transfers data of a virtual page corresponding to a PTE that has the value "0" in "A BIT" and in which a physical address is mapped in the page table 45 of the migration target process.

When the pieces of data in the first area and the second area are transferred, information indicates in which physical page or in which virtual page each of the pieces of data has been stored is transferred together. This information is, for example, an address of a physical page or a virtual page the data has been stored in.

(Configuration of Migration Destination Node)

Next, a configuration of the migration destination node 17 is described. FIG. 5 illustrates an example of a configuration of the migration destination node according to the embodiment. In FIG. 5, the migration destination node 17 includes a CPU 61, a memory 62, a storage 63, and a communication interface 64.

The CPU 61 includes an arithmetic unit 71 and an MMU 72. The arithmetic unit 71 includes a processing unit 81 and a reception controller 82. The processing unit 81 is an example of the sleep controller 9. The reception controller 82 is an example of the receiver 7, the restart controller 8, and the wake-up controller 10.

As is the case with the processing unit 41 of the migration source node 16, the processing unit 81 executes an OS or a variety of processing. However, the operation of the page fault handler when a memory access is made during migration is different from the operation performed in the migration source node 16. This will be described in detail later.

The reception controller 82 performs migration processing on a process in the migration destination node 17. Specifically, the reception controller 82 receives information on a migration target process from the migration destination node, and performs processing of restarting the migration target process. The migration processing will be described in detail later.

The MMU 72 is similar to the MMU 32 of the migration source node 16. The MMU 72 includes an access controller 83 and a cache 84. The access controller 83 and the cache 84 are similar to the access controller 43 and the cache 44, respectively.

The memory 62 stores therein a page table 85, context information 86 on each process, and a physical page 87 assigned to each process.

The page table 85 has a configuration similar to the configuration described with reference to FIG. 4.

Like the context information 46 of the migration source node 16, the context information 86 is information that indicates a state of a process. However, the context information 86 further includes transfer state information 88.

The transfer state information 88 is control information used for an access control of a process during migration. The transfer state information 88 indicates whether data in a memory space for the migration target process is being transferred. In other words, the transfer state information 88 indicates whether the transfer of all of the data in the memory space for the migration target process has been completed. In the embodiment, it is assumed that, when the value of the transfer state information 88 is "during transfer", the transfer state information 88 indicates that the transfer of a portion of the data in the memory space for the migration target process has not been completed. Further, it is assumed that, when the value of the transfer state information 88 is "transfer completed", the transfer state information 88 indicates that the transfer of all of the data in the memory space for the migration target process has been completed. According to the value of the transfer state information, the page fault handler changes processing that is performed when a page fault is generated. This processing will be described in detail later.

The physical page 87 is a physical storage area having a predetermined size that is mapped to a virtual page.

The storage 63 stores therein various pieces of data. The storage 63 may include a swap area.

The communication interface 64 performs transmission/reception of data to/from the migration source node 16. Data transferred from the migration source node 16 is received through the communication interface 64 and stored in the memory 62 or the storage 63.

Next, the migration processing performed by the reception controller 82 in the migration destination node 17 is described.

(Migration Processing in Migration Destination Node)

The reception controller 82 performs the migration processing on a process in the migration destination node 17. As described above, in the migration processing of the embodiment, context information 46 and a page table 45 for the migration target process, and the data in the virtual memory space assigned to the migration target process are transferred from the migration source node 16. The data in the memory space for the migration target process is transferred in two stages. In other words, the data in the first area is transferred as a first stage, and then, the data in the second area is transferred as a second stage.

The reception controller 82 restarts the migration target process in the migration destination node 17 when the transfer of the data in the first area from the migration source node 16 has been completed. At this point, on the basis of the context information 46 and the page table 45, the migration target process is controlled to be restarted from the state when the migration target process was stopped in the migration source node 16. Then, the reception controller 82 receives the data in the second area after the transfer of the data in the first area has been completed. In other words, the reception of the data in the second area is performed in parallel with the restart (the execution) of the migration target process.

The first area is a memory area that has been accessed by the migration target process in the migration source node 16 for a latest predetermined period of time. The first area is an area that is more likely to be accessed after the migration target process is restarted. Further, the data in the first area includes data that was being used before the start of the migration of the migration target process. Thus, when the transfer of the data in the first area has been completed, it becomes possible to restart the migration target process. At least just after the restart, the migration target process operates normally. However, there is a possibility that an access will be made to the second area at any point of time after the process is restarted. There is a possibility that the data in the second area will still not be transferred when the access is made. In the embodiment, when an access is made to a non-transfer area in the second area, the process is caused to transition to a sleep state, and the processing is restarted when the transfer of the data in the second area has been completed.

When the transfer of the data in the first area has been completed, the migration destination node 17 of the embodiment restarts the process. As a result, compared with the case in which the migration target process is restarted after the transfer of the data in the entirety of the memory space for the process has been completed, it is possible to reduce process downtime. Specifically, for example, as is the case in the field of high-performance computing (HPC), when an amount of memory space for a migration target process is huge, the effects of reducing the downtime are increased.

Further, when an access has been made to the non-transfer area in the second area, the migration destination node 17 of the embodiment causes the process to sleep, and causes the process to wake up after the transfer of the data in the second area has been completed. This prevents an abnormal termination of the process due to, for example, error when an access has been made to the non-transfer area. Further, also in this case, the process is executed in parallel with the transfer of the data in the second area from when the process is restarted after the transfer of the data in the first area has been completed to when an access is made to the non-transfer area in the second area. Thus, compared with the case in which the migration target process is restarted after the transfer of data in the entirety of a memory space for the process has been completed, it is possible to reduce total process downtime in migration.

The migration processing in the migration destination node 17 is specifically described. First, the reception controller 82 receives the context information 46 and the page table 45 for a migration target process from the migration source node 16. On the basis of the context information 46 and the page table 45, the reception controller 82 creates, in the migration destination node 17, a process in the same state as that of the migration target process (hereinafter referred to as a target process). In other words, the reception controller 82 newly creates the target process and updates context information 86 on the created target process such that the context information 86 corresponds to the received context information 46 on the migration target process. Further, on the basis of the received page table 45 of the migration target process, the reception controller 82 initializes the page table 85 of the target process. This initialization results in assigning the same virtual address space as that of the migration target process to the target process of the migration destination node 17. At this point, a physical address is still not associated with (mapped to) a virtual address.

Next, the reception controller 82 receives the data in the first area of the migration target process from the migration source node 16. Then, the reception controller 82 assigns, to a virtual page for the target process, a physical page that has stored therein the received data in the first area. In other words, the reception controller 82 stores the received data in a space area of the memory 62 so as to update the page table 85. When the page table 85 is updated, the reception controller 82 maps a physical page that has stored therein the received data to a virtual page for that data. Accordingly, the same environment is established in both the migration source node 16 and the migration destination node 17 with respect to the mapping of the virtual page and the physical page in the page table 85. The update of the page table 85 is described in detail later.

In this case, in the description of the embodiment, it is assumed that "the transfer of data has been completed" refers to processing performed by the reception controller 82, the process including receiving the data from the migration source node 16, storing the data in the physical memory 62, and updating the page table 85 as described above.

When the transfer of all of the data in the first area has been completed, the reception controller 82 causes the created target process to transition to an execution state (restarts the created target process). The determination of whether the transfer of all of the data in the first area has been completed is performed on the basis of the received page table 45. Specifically, the reception controller 82 determines whether the transfer of all data in an area in which an access bit in the page table 45 is "1" has been completed.

While causing the target process to transition to an execution state, the reception controller 82 receives the data in the second area in parallel. Then, the reception controller 82 maps a physical page that has stored therein the received data in the second area to a virtual page for the target process. In other words, the reception controller 82 stores the received data in a space area of the memory 62 so as to update the page table 85.

After the restart of the execution of the target process, there is a possibility that a memory access will be made by the target process. The target process can access desired data with respect to an access to an area in which the transfer of the data has been completed, but the target process is not allowed to access desired data with respect to an access to the second area in which the transfer of the data has not been completed. In the latter case, the target process is controlled to transition to a sleep state, and is controlled to wake up after the transfer of untransferred data in the second area has been completed. The memory access made by the target process will be described in detail later.

When the transfer of the data in the second area has been completed, the reception controller 82 updates the value in the transfer state information 88 in the context information 86 from "during transfer" to "transfer completed". Then, the reception controller 82 causes the target process to wake up when the target process is in a sleep state.

(Processing of Updating Page Table With Respect to Transferred Data)

Next, the processing of updating the page table 85 that is performed when data is received from the migration source node 16 is described.

When it receives data from the migration source node 16, the reception controller 82 stores the received data in a physical page in a space area of the memory 62. Then, the reception controller 82 maps the physical page that has stored therein the data to a virtual page for the target process. Here, the reception controller 82 performs mapping such that the mapping of a virtual page and a physical page is the same in the page table 45 of the migration source node 16 and the page table 85 of the migration destination node 17. The mapping is performed on the basis of the received page table 45 and information that indicates in which physical page or in which virtual page the received data has been stored in the migration source node 16. Specifically, for example, the reception controller 82 stores, in "PHYSICAL ADDRESS" of a PTE in the page table 85 of the target process, the address of the physical page that has stored therein the received data. "P BIT" and "A BIT" of the PTE are updated, on the basis of the page table 45, such that the same value is given in "P BIT" and the same value is given in A BIT" in the migration source and the migration destination. For example, it is assumed that a physical address B is mapped to a virtual address A in the migration source node 16. Further, it is assumed that data C that has been stored in the physical address B is stored in a physical address B' in the migration destination node 17. In this case, the reception controller 82 updates a PTE in the page table 85 such that the physical address B' is mapped to the virtual address A in the migration destination node 17.

(Operation when Memory Access is Made)

Next, an operation when a memory access is made in the migration destination node 17 is described.

With respect to a memory access made by a target process, an operation of the MMU 72 is similar to that of the MMU 32 of the migration source node 16. In other words, the MMU 72 performs address translation processing on a virtual address that is input from the arithmetic unit 71. Further, for example, when an access has been made to a virtual page to which a physical page is not assigned, the MMU 72 generates a page fault.

In this case, there exists a non-transfer page from among the virtual pages in the second area from when the target process transitions to an execution state to when the transfer of all of the data in the second area has been completed. A physical page and a virtual page are mapped to each other in the page table 85 when the transfer is completed, and with respect to the non-transfer page, a mapping has not been performed yet. When an access has been made to an unmapped virtual page, the MMU 72 generates a page fault so as to report it to the arithmetic unit 71. Thus, even when an access has been made to the second area in which the transfer has not been performed, the MMU 72 determines that an access has been made to a virtual page to which a physical page is not assigned, and reports a page fault to the arithmetic unit 71.

When a page fault is reported, the page fault handler is started in the OS. In the migration destination node 17, the page fault handler determines whether a page to be accessed with respect to an access for which a page fault is generated is a non-transfer page in the second area. When the page to be accessed is a non-transfer page, the page fault handler causes the target process to transition to a sleep state. The sleeping target process is caused by the reception controller 82 to wake up after the transfer of all of the data in the second area has been completed. On the other hand, when the page to be accessed is not a non-transfer page in the second area, the page fault handler performs the page-fault fixing processing described above, as is the case with the migration source node 16.

Specific processing performed by the page fault handler is described.

First, the page fault handler determines whether the transfer of all of the data in the second area has been completed with respect to a target process in which a page fault has been generated. Specifically, first, the page fault handler refers to the transfer state information 88 in the context information 86. When the value of the transfer state information 88 is "during transfer", the page fault handler determines that the transfer of a portion of the data in the memory space for the migration target process has not been completed. Further, when the value of the transfer state information 88 is "transfer completed", the page fault handler determines that the transfer of all of the data in the memory space for the migration target process has been completed.

When the transfer of all of the data in the second area has been completed, there does not exist a page fault that is generated due to the fact that data is untransferred, so the page fault handler performs the page-fault fixing processing similar to that in the migration source node 16.

On the other hand, when the transfer of a portion of the data in the second area has not been completed, the page fault handler determines whether the virtual page to be accessed is a non-transfer page from among the transfer target virtual pages. Specifically, first, the page fault handler refers to the page table 45 received from the migration source node 16, so as to determine whether the virtual page to be accessed is a transfer target virtual page. The transfer target virtual page is a virtual page in the first area or the second area. The virtual page in the first area or the second area is a virtual page to which a physical page is mapped in the page table 45 received from the migration source node 16. Thus, the page fault handler determines whether a physical address is mapped to an access target virtual address in the page table 45 received from the migration source node 16, so as to determine whether the virtual page to be accessed is a transfer target virtual page. When it is determined that the virtual page to be accessed is not a transfer target virtual page, the page fault handler performs the page-fault fixing processing similar to that in the migration source node 16.

When it is determined that the virtual page to be accessed is a transfer target virtual page, the page fault handler refers to the page table 85 of the target process of the migration destination node 17, so as to determine whether a physical address is mapped to the access target virtual address. A physical page has been mapped to a virtual address in which the transfer has been completed. Thus, the page fault handler determines whether a physical address is mapped to the access target virtual address, so as to determine whether the page to be accessed is a non-transfer page. When data to be accessed is data that has been transferred, the page fault handler performs the page-fault fixing processing similar to that in the migration source node 16.

On the other hand, when the page to be accessed is a non-transfer page, the page fault handler causes the target process to transition to a sleep state. The sleeping target process is caused by the reception controller 82 to wake up after the transfer of data in the non-transfer page has been completed.

When the target process is restarted, the page fault handler restarts the processing starting with accessing again the virtual page in which a page fault has been generated with respect to the target process.

(Flow of Migration Processing in Migration Source Node)

FIG. 6 is a flowchart of an example of detailed migration processing performed by the transmission controller in the migration source node.

In FIG. 6, first, the transmission controller 42 receives a migration-source processing request that instructs to perform migration on a migration target process (S101). When it receives the migration request, the transmission controller 42 stops the communication of the migration target process (S102). Next, the transmission controller 42 stops the migration target process (S103).

Next, the transmission controller 42 transfers context information 46 on the migration target process to the migration destination node 17 (S104). The context information 46 to be transferred is information that indicates a state of the migration target process when it is stopped.

Next, the transmission controller 42 transfers a page table 45 of the migration target process to the migration destination node 17 (S105).

Next, the transmission controller 42 determines a first area in a memory space that is assigned to the migration target process (S106). In other words, the transmission controller 42 determines, to be the first area, a collection of physical pages that are given in "PHYSICAL PAGE" of PTEs having the value "1" in "A BIT" in the page table 45. A second area is an area other than the first area in the memory space for a migration target process, so the second area will be determined when the first area is determined. The transmission controller 42 may determine, to be the second area, a collection of physical pages that are given in "PHYSICAL PAGE" of PTEs having the value "0" in "A BIT" in the page table 45. A PTE in which mapping is not performed on a physical address is not included in the PTEs that correspond to the second area.

Next, the transmission controller 42 transfers data stored in the determined first area to the migration destination node 17 (S107).

When the transfer of all of the data in the first area has been completed, the transmission controller 42 transfers data in the second area to the migration destination node (S108).

Then, the processing is terminated. The processes of S104 and S105 may be performed in the reverse order if they are performed after the process of S103 and before the process of S107.

(Flow of Migration Processing in Migration Destination Node)

Figure 7:
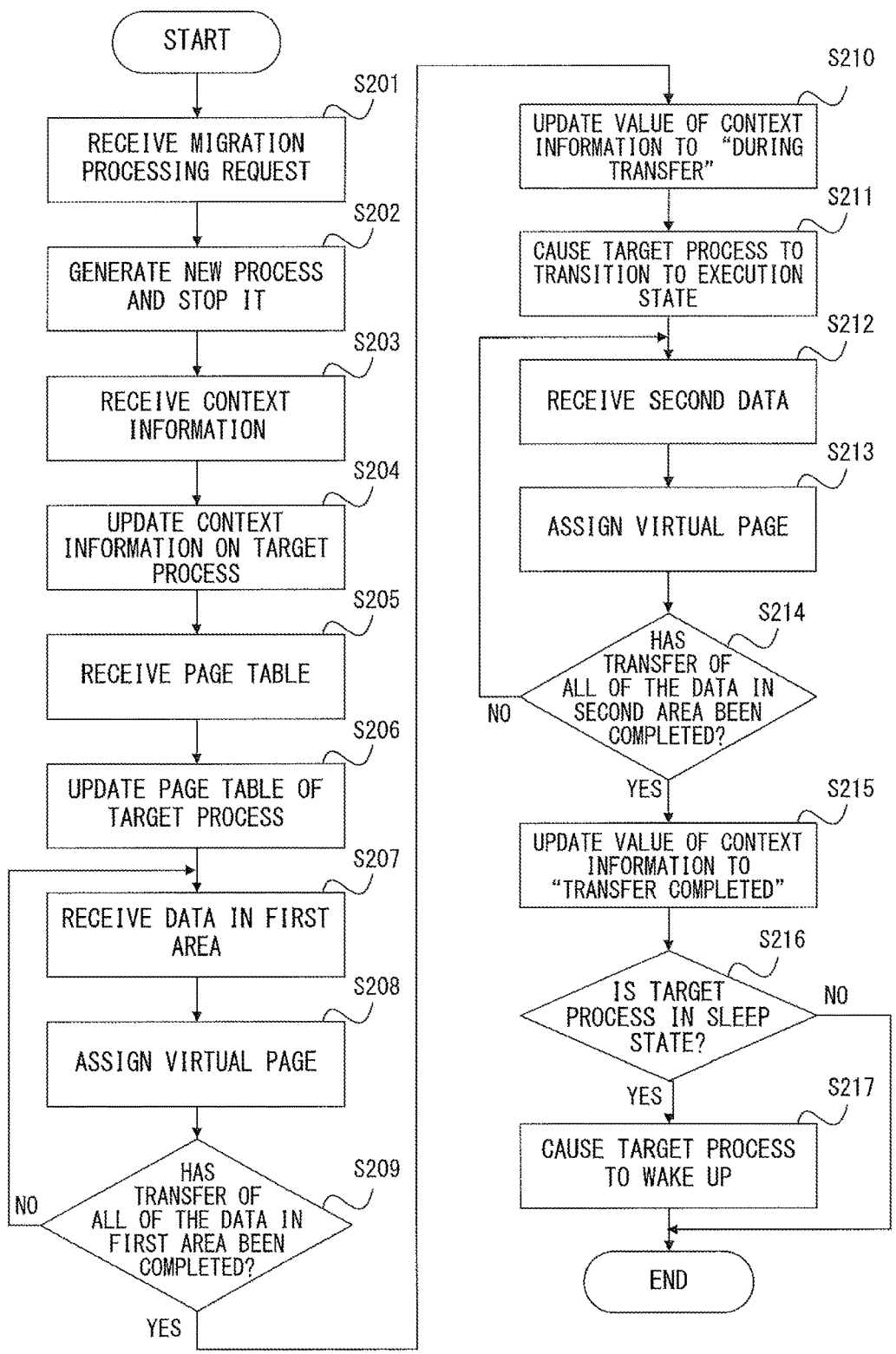
FIG. 7 is a flowchart of an example of detailed migration processing performed by the reception controller in the migration destination node.

FIG. 7 is a flowchart of an example of detailed migration processing performed by the reception controller in the migration destination node.

In FIG. 7, first, the reception controller 82 receives a request to perform migration processing on a process in the migration destination node (S201). When it receives the processing request, the reception controller 82 generates anew target process and causes the generated target process to transition to a stop state (S202). Context information 86 and a page table 85 that correspond to the target process are generated along with the generation of the target process.

Next, the reception controller 82 receives the context information 46 on the migration target process from the migration source node 16 (S203). Then, on the basis of the received context information 46, the reception controller 82 updates (copies) the context information 86 on the target process to the content of the context information on the migration target process (S204). This permits the newly generated target process to be in the same state as that of the migration target process with respect to the context information. When the update is performed, environment-dependent information in the context information may be appropriately modified according to the environment in the migration destination node.

Next, the reception controller 82 receives the page table 45 of the migration target process from the migration source node 16 (S205). Then, on the basis of the received page table 45, the reception controller 82 updates the page table 85 of the target process and initializes it (S206). When the update is performed, the reception controller 82 updates the page table 85 of the target process such that is the page table 85 indicates that a virtual address space that is the same as a virtual address space of the migration target process is assigned to the target process. At this point, a physical address is not associated with (mapped to) a virtual address in the page table 85.

Next, the reception controller 82 receives the data in the first area from the migration source node 16 (S207). Then, the reception controller 82 performs assignment of a virtual page that corresponds to the received data in the first area (S208). In other words, the reception controller 82 stores the received data in an empty physical page of the memory 62, maps the physical page to the virtual page that corresponds to the received data, and records the mapping information in a PTE in the page table 85.

Next, the reception controller 82 determines whether the transfer of all of the data in the first area has been completed (S209). Specifically, for example, first, the reception controller 82 selects all of the PTEs having the value "1" in "A BIT" in the received page table 45. Then, with respect to data of all of the virtual pages corresponding to the selected PTEs, the reception controller 82 refers to the page table 85 and determines whether the transfer has been completed. The determination of whether the transfer has been completed is performed on the basis of whether a virtual address and a physical address of the first area are mapped to each other in the page table 85.

When it is determined that the transfer of a portion of the data in the first area has not been completed (No in S209), the process moves on to S207 again. On the other hand, when the transfer of all of the data in the first area has been completed (Yes in S209), the reception controller 82 changes the value of the transfer state information 88 to "during transfer" in the context information 86 on the target process (S210).

Next, the reception controller 82 causes the target process to transition to an execution state (S211).

Next, the reception controller 82 receives the data in the second area from the migration source node 16 (S212). Then, the reception controller 82 performs assignment of a virtual page that corresponds to the received data in the second area (S213). In other words, the reception controller 82 stores the received data in an empty physical page of the memory 62, maps the physical page to the virtual page that corresponds to the received data, and records the mapping information in the page table 85.

Next, the reception controller 82 determines whether the transfer of all of the data in the second area has been completed (S214). Specifically, for example, first, the reception controller 82 selects all of the PTEs that have the value "0" in "A BIT" and in which a physical address is mapped in the received page table 45. Then, with respect to data of all of the virtual pages corresponding to the selected PTEs, the reception controller 82 refers to the page table 85 and determines whether the transfer has been completed. The determination of whether the transfer has been completed is performed on the basis of whether a virtual address and a physical address of the second area are mapped to each other in the page table 85.

When it is determined that the transfer of a portion of the data in the second area has not been completed (No in S214), the process moves on to S212 again. On the other hand, when the transfer of all of the data in the second area has been completed (Yes in S214), the reception controller 82 changes the value of the transfer state information 88 to "transfer completed" in the context information 86 on the target process (S215).

Next, the reception controller 82 determines whether the target process is in a sleep state (S216). When it is determined that the target process is not in a sleep state (No in S216), the processing is terminated. On the other hand, when it is determined that the target process is in a sleep state (Yes in S216), the reception controller 82 causes the target process to wake up (S217). Then, the processing is terminated.

The execution order of S203 is not limited if it is executed after S201 and before S204. The execution order of S205 is not limited if it is executed after S201 and before S206. The execution order of S204 is not limited if it is executed after S202 and S203, and before S211. The execution order of S206 is not limited if it is executed after S202 and S205, and before S211. The execution order of S210 is not limited if it is executed after S201 and before S211.

Further, in S209, the determination of whether the transfer of all of the data in the first area may be realized, for example, as follows. When the transmission of data in the first area has been completed in the migration source node 16, the migration source node 16 may transmit completion information indicating that the transmission of the data in the first area has been completed and the migration destination node 17 may determine, on the basis of the completion information, that the transfer of all of the data in the first area has been completed. The determination with respect to the second area in S214 may also be realized in a similar way.

(Flow of Processing Performed by Page Fault Handler in Migration Destination Node)

Figure 8:
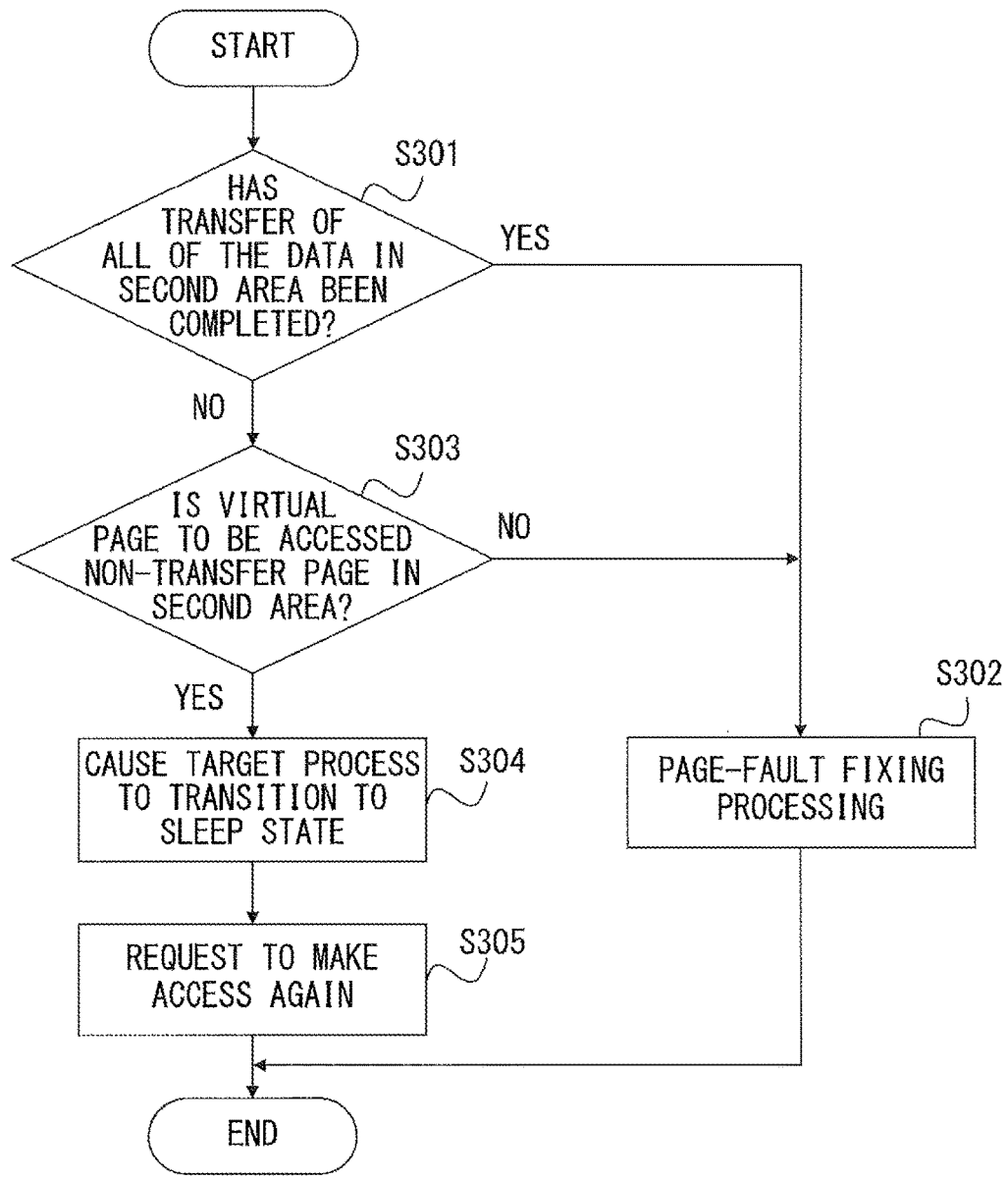
FIG. 8 is a flowchart of an example of detailed processing performed by a page fault handler in the migration destination node.

FIG. 8 is a flowchart of an example of detailed processing performed by the page fault handler in the migration destination node.

In FIG. 8, first, with respect to a target process in which a page fault has been generated, the page fault handler determines whether the transfer of all of the data in the second area has been completed (S301). Specifically, the page fault handler determines whether the value of the transfer state information 88 in the context information 86 is "transfer completed". When it is determined that the transfer of all of the data in the second area has been completed (Yes in S301), the page fault handler performs page-fault fixing processing (S302). Then, the processing is terminated.

On the other hand, when the transfer of a portion of the data in the second area has not been completed (No in S301), the page fault handler determines whether a virtual page to be accessed is a non-transfer page in the second area (S303).

When it is determined that the virtual page to be accessed is not a non-transfer page in the second area (No in S303), the process moves on to S302. On the other hand, when it is determined that the virtual page to be accessed is a non-transfer page from among the transfer target virtual pages (Yes in S303), the page fault handler causes the target process to transition to a sleep state (S304). While the target process is in a sleep state, the data in the second area is received by the reception controller 82, and the processing of assignment of a virtual page corresponding to the data in the second data is performed (S213 in FIG. 7). The sleeping target process is caused by the reception controller 82 to wake up when the reception of all of the data in the second area has been completed (S217 in FIG. 7).

When the target process is restarted, the page fault handler instructs the target process to access again the virtual page in which a page fault has been generated (S305). Then, the processing is terminated.

(Hardware Configuration of Node)

Next, an example of a hardware configuration of the migration source node 16 and the migration destination node 17 is described. FIG. 9 illustrates an example of a hardware configuration of the migration source node 16 and the migration destination node 17 according to the embodiment.

In FIG. 9, the migration source node 16 and the migration destination node 17 each include a CPU 91, a memory 92, a storage 93, a reader 94, and a communication interface 95. The CPU 91, the memory 92, the storage 93, the reader 94, and the communication interface 95 are connected to one another through, for example, a bus 96 or a communication network.

The CPU 91 includes an MMU 97. Further, the CPU 91 provides some of or all of the functions of the arithmetic unit 31, 71 by executing, by use of the memory 92, a program in which a procedure of the corresponding flowchart described above is specified. The CPU 91 is an example of the CPU 21, 61. The MMU 97 is an example of the MMU 32, 72.

The memory 92 is, for example, a semiconductor memory, and is configured to include a random access memory (RAM) area and a read only memory (ROM) area. The memory 92 is an example of the memory 22, 62.

The storage 93 is, for example, a hard disk. The storage 93 may be a semiconductor memory such as a flash memory. Further, the storage 93 may be an external storage. The storage 93 is an example of the storage 23, 63.

The reader 94 accesses a removable storage medium 99 according to an instruction issued by the CPU 91. The removable storage medium 99 is realized by, for example, a semiconductor device (such as a USB memory), a medium into/from which information is input/output by magnetic action (such as a magnetic disk), or a medium to/from which information is input/output by optical action (such as a CD-ROM and a DVD). The reader 94 does not have to be included in the migration source node 16 or the migration destination node 17.

The communication interface 95 communicates with another node according to an instruction issued by the CPU 91. The communication interface 95 is an example of the communication interface 24, 64.

The program of the embodiment is provided to the migration source node 16 or the migration destination node 17, for example, in the following state:
(1) Preinstalled in the storage 93
(2) Provided by the removable recording medium 99
(3) Provided from a program server (not illustrated) through the communication interface 95

Further, a portion of the migration source node 16 and a portion of the migration destination node 17 according to the embodiment may be realized by hardware. Alternatively, the migration source node 16 and the migration destination node 17 according to the embodiment may be realized by a combination of software and hardware.

The memory 92 may be shared by the migration source node 16 and the migration destination node 17. The storage 93 may be shared by the migration source node 16 and the migration destination node 17.

Further, the migration source node 16 and the migration destination node 17 may be virtual machines that operate on the same physical server or on different physical servers. In this case, the CPU 91, the memory 92, the storage 93, the reader 94, and the communication interface 95 may be shared by the migration source node 16 and the migration destination node 17.

Further, in the embodiment, the migration target is a process, but the migration target may be a VM or a variety of software.

The embodiment is not limited to the above described embodiment, and it should be understood that various changes, substitutions, and alterations could be made hereto without departing from the spirit of the invention.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A parallel computing system that migrates, to a second node, a target process that is being executed in a first node, the first node and the second node being one of the nodes that are an execution unit for processing of executing a process,
    the first node comprises:
        a storage configured to store therein accessed-area information that indicates a first area included in a storage area assigned to the target process, the first area having been accessed by the target process for a latest predetermined period of time;
        a processor in the first node configured to stop the target process when an instruction to migrate the target process is received; and
        a transmitter configured to transmit state information that indicates a state of the target process when the target process is stopped, to transmit first data stored in the first area based on the accessed-area information, and to transmit, after the transmission of the first data has been completed, second data stored in a second area other than the first area in the storage area, and
    the second node comprises:
        a receiver configured to receive the state information and the first data; and
        a processor in the second node configured to generate the target process based on the state information and to restart the target process using the first data,
    the receiver receives the second data after the restart of the target process,
    when an access has been made to a certain area which is included in the second area and from which data has not been received, the processor in the second node causes the target process to sleep in response to the access, and
    when the data in the certain area from which the data has not been received is received, the processor in the second node causes the sleeping target process to wake up.

2. The parallel computing system according to claim 1, wherein the accessed-area information is information recorded in a page table of the target process by a memory management unit provided in a central processing unit that executes the target process.

3. A migration method that is executed by a computer, the method comprising:
    stopping a target process that is being executed in a first node that is one of the nodes that are an execution unit for processing of executing a process;
    transferring, from the first node to a second node, state information that indicates a state of the target process when the target process is stopped;
    transferring, from the first node to the second node, first data stored in a first area, based on accessed-area information stored in a storage that stores therein the accessed-area information that indicates the first area included in a storage area, wherein the first area has been accessed by the target process for a latest predetermined period of time, and the storage area belongs to the first node and is assigned to the target process;
    transferring, from the first node to the second node, second data stored in a second area other than the first area in the storage area after the transfer of the first data has been completed; and
    generating, by the second node, the target process based on the transferred state information and restarting, by the second node, the target process using the transferred first data,
    the second node receives the second data transferred from the first node after the restart of the target process,
    when an access has been made to a certain area which is included in the second area and from which data has not been received by the second node, the second node causes the target process to sleep in response to the access, and
    when the data in the certain area from which the data has not been received is received, the second node causes the sleeping target process to wake up.

* * * * *